United States Patent [19]

Londrigan

[11] Patent Number: 4,652,591

[45] Date of Patent: Mar. 24, 1987

[54] REACTION PRODUCTS OF TEREPHTHALIC ACID RESIDUES AND POLYCARBOXYLIC ACID-CONTAINING POLYOLS AND POLYMERIC FOAMS OBTAINED THEREFROM

[75] Inventor: Michael E. Londrigan, Safety Harbor, Fla.

[73] Assignee: Jim Walter Resources, Inc., Birmingham, Ala.

[21] Appl. No.: 797,303

[22] Filed: Nov. 12, 1985

[51] Int. Cl.$^4$ .............................................. C08G 18/14
[52] U.S. Cl. .................................... 521/172; 521/173; 528/299; 528/302; 528/303; 528/304; 528/305; 528/308.1; 528/308.6; 252/182; 560/89; 560/90; 560/91; 560/92; 427/373; 427/385.5; 428/319.3; 428/319.7; 428/423.1
[58] Field of Search ............... 521/172, 173; 528/299, 528/302, 303, 304, 305, 308.1, 308.6; 252/182; 560/89, 90, 91, 92, 94; 427/373, 385.5; 428/319.3, 319.7, 423.1

[56] References Cited

U.S. PATENT DOCUMENTS

| | | | |
|---|---|---|---|
| 3,647,759 | 3/1972 | Walker | 260/75 R |
| 4,100,354 | 7/1978 | Owen, Jr. | 560/89 |
| 4,237,238 | 12/1980 | DeGuiseppi et al. | 521/131 |
| 4,246,365 | 1/1981 | Wiedermann et al. | 521/172 |
| 4,346,229 | 8/1982 | Derr et al. | 560/91 |
| 4,400,477 | 8/1983 | Blanpied | 521/112 |
| 4,411,949 | 10/1983 | Snider et al. | 428/304.4 |
| 4,444,915 | 4/1984 | Grube et al. | 521/131 |
| 4,444,918 | 4/1984 | Brennan | 521/131 |
| 4,444,920 | 4/1984 | Brennan | 521/173 |
| 4,469,821 | 9/1984 | Anderson | 521/131 |
| 4,506,090 | 3/1985 | Brennan et al. | 560/91 |
| 4,526,908 | 7/1985 | Magnus et al. | 521/172 |
| 4,539,341 | 9/1985 | Hallmark et al. | 521/172 |

OTHER PUBLICATIONS

J. A. Murphy and B. C. Wilbur, "A Comparison of Propylene Oxide vs. Ethylene Oxide-Based Aromatic Polyester Polyols; Performance Evaluation in Rigid Foam", SPI Meeting, 28th Annual Technical and Marketing Conference, San Antonio, Texas, Nov., 1984.

Primary Examiner—Maurice J. Welsh
Attorney, Agent, or Firm—James W. Grace; Charles W. Vanecek

[57] ABSTRACT

A polyester polyol mixture is prepared by reacting a polycarboxylic acid component-containing polyol with a terephthalic acid residue, wherein the polycarboxylic acid component has ring units with two

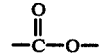

groups on adjacent or alternate ring positions, the ring unit content of the polycarboxylic acid component being sufficient for viscosity reduction of the polyester polyol mixture. The polyester polyol mixture is useful in the preparation of cellular foam materials, particularly polyisocyanurate and polyurethane foams, and laminates thereof.

21 Claims, 3 Drawing Figures

REACTION PRODUCTS OF TEREPHTHALIC ACID RESIDUES AND POLYCARBOXYLIC ACID-CONTAINING POLYOLS AND POLYMERIC FOAMS OBTAINED THEREFROM

BACKGROUND OF THE INVENTION

1. Field of the Invention

This invention relates to polyester polyols which are the hydroxyl-terminated reaction products of (a) terephthalic acid residues and (b) polycarboxylic acid-containing polyols. The polyols are useful in the preparation of cellular foam materials, particularly polyisocyanurate and polyurethane foams.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

U.S. Pat. No. 4,039,487, for example, discloses the use of aromatic polyester polyols to prepare polyisocyanurate foams. Although the foams of this patent have good fire resistance and low smoke evolution upon combustion, they have a relatively high friability. Furthermore, the polyols are comparatively expensive to manufacture.

U.S. Pat. No. 4,092,276 also discloses the use of rather costly aromatic polyester polyols in preparing polyisocyanurate foams. Another disadvantage of these foams is that they do not have especially high compressive strength. A further problem with using aromatic polyester polyols, particularly those of low molecular weight, is that the polyols tend to be solid at room temperature, or to be characterized by very high viscosity and poor solubility in resin mixtures, thus making them difficult to handle.

To remedy the above drawbacks, it has been proposed to U.S. Pat. No. 4,237,238 to use in the preparation of polyisocyanurate foams a minor amount of a cheap by-product type of liquid polyol mixture which is obtained by the transesterification, with a glycol of molecular weight from about 60 to 400, of a dimethyl terephthalate esterified oxidate reaction product residue. The polyisocyanurate foams produced are disclosed to be characterized by a high degree of fire resistance with low smoke evolution on combustion, a low foam friability and reasonably good compressive strength.

Further, U.S. Pat. No. 4,346,229 describes how liquid aromatic polyester polyols having excellent shelf stability and compatibility and trichlorofluoromethane can be produced by reacting DMT process residue with an excess of dipropylene glycol. However, deficiencies have been encountered in the fluidity of these polyester polyols, leading to difficulties in employing them in foam production.

OBJECTS OF THE INVENTION

It is accordingly an object of the present invention to provide an aromatic polyester polyol composition having a combination of advantageous properties, including a desirably low viscosity and good storage stability and compatibility with halohydrocarbon blowing agents, and a method of producing the polyol composition.

It is another object of the present invention to provide for use of the aromatic polyester polyol in producing polyisocyanurate and polyurethane foams having a combination of advantageous properties, including a reduced friability, and high thermal resistance, compressive strength, and dimensional stability.

It is a further object of the present invention to provide improved rigid cellular foams, especially polyisocyanurate and polyurethane foams, having a combination of advantageous properties, including a reduced friability, and high thermal resistance, compressive strength, and insulation properties, and an improved method of producing the foams.

It is an additional object of the present invention to produce an improved rigid polyisocyanurate foam material characterized by a high degree of fire resistance with low smoke evolution and flame spread on combustion, and the formation of a protective char over unburnt foam upon combustion.

It is a still further object of the present invention to provide closed cell polyisocyanurate and polyurethane foam materials which can be used in building panels which are highly insulating, thermally resistant, low in friability, soundproof and self-supporting.

These and other objects and advantages of the present invention will become more apparent by reference to the following detailed description and drawings wherein:

DESCRIPTION OF THE INVENTION

The above objects have been achieved and the drawbacks of the prior art have been overcome by the development of improved aromatic polyester polyol mixtures, which are prepared by reacting terephthalic acid residues with a medium comprising a polycarboxylic acid component-containing polyol, the polycarboxylic acid component having ring units with two groups on adjacent (or ortho) or alternate (or meta) ring positions.

More specifically, the aromatic polyester polyol mixture of the invention is prepared by

(a) transesterification, with the polycarboxylic acid component-containing polyol, of a residue remaining after dimethyl terephthalate and methyl p-toluate have been removed from the product of oxidation of p-xylene in the preparation of dimethyl terephthalate, or (b) esterification, with the polycarboxylic acid component-containing polyol, of a carboxyl functional residue resulting from the removal of terephthalic acid from the mixture obtained by the oxidation of p-xylene in the preparation of terephthalic acid.

The polycarboxylic acid component should have a sufficient content of the ring units with ortho or meta groups for improved viscosity of the transesterification or esterification product. A preferred transesterifying or esterifying polyol of the invention contains o-phthalic and/or isophthalic acid residues. By o-phthalic and isophthalic acid residues are meant the groups respectively. The resulting polyol products can be reacted with organic polyisocyanates in the presence of a blowing agent and catalyst to produce polyisocyanurate and polyurethane foams. The process of producing the foam benefits considerably from the fluidity and improved storage stability of the aromatic polyester polyols of the invention.

The DMT process residues are waste or scrap residues from the manufacture of dimethyl terephthalate. The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenyls. Dimethyl terephthalate may be present in amounts ranging from 6 to 65% of the DMT process residue. Hercules, Inc., Wilmington, Del., sells DMT process residues under the trademark Terate ®101. Similar DMT process residues having a different composition but still containing the aromatic esters and acids are also sold by DuPont and others. The DMT process residues to be transesterified in accordance with the present invention preferably have a functionality at least slightly greater than 2.

One such suitable residue is the DMT residue disclosed in U.S. Pat. No. 3,647,759, the disclosure of which with respect to the residue is hereby incorporated by reference. This residue has been described as the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. U.S. Pat. No. 3,647,759 describes in detail the residue set forth above and characterizes its properties.

Another suitable residue is disclosed in U.S. Pat. No. 4,411,949, the disclosure of which with respect to the residue is hereby incorporated by reference. This residue has been described as a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful by-product fraction from the manufacture of dimethyl terephthalate comprises a mixture of (a) about 40 to 60 percent by weight of dimethyl terephthalate, (b) about 1 to 10 percent by weight of monomethyl terephthlate, (c) about 1 to 2 percent by weight of terephthalic acid, (d) about 10 to 25 percent by weight of bi-ring esters, (e) about 5 to 12 percent by weight of organic acid salts, (f) about 18 to 25 percent by weight of polymeric materials, and (g) about 1 to 4 percent by weight of ash.

Alternatively, the terephthalic acid residue may comprise the product remaining after the removal of terephthalic acid from the mixture obtained by the oxidation of p-xylene in the preparation of terephthalic acid. This residue contains carboxyl groups which can be esterified with the polycarboxylic acid component-containing polyol.

The polycarboxylic acid component-containing polyol is derived from a polycarboxylic acid component and a polyol component. In the reaction of the terephthalic acid residues with the polycarboxylic acid component-containing polyol, the transesterifying or esterifying medium may comprise a polyol and a polycarboxylic acid or acid derivative, such as an anhydride or ester of the polycarboxylic acid. Since the polycarboxylic acid component is converted to a polyester either before or during the reaction, the polycarboxylic acid component-containing polyol can be defined as the reaction product of a mixture of transesterifying or esterifying polycarboxylic acid and polyol components. The ingredients can be introduced in various ways in the process. For example, all ingredients can be charged at the same time to the reaction vessel and thereupon reacted together. In a preferred method, the polycarboxylic acid or acid derivative is pre-reacted with a polyol to form a polyester polyol, and then the terephthalic acid residue is reacted with the preformed polyester polyol. In an alternative method, the residue first is reacted with a polyol, and the polycarboxylic acid or acid derivative thereof subsequently is added to the reactor and the reaction continued to completion. Various mixtures of tranesterifying or esterifying reactants, such as mixtures of diols, like diethylene glycol, dipropylene glycol, triethylene glycol, tripropylene glycol, tetraethylene glycol, tetrapropylene glycol, trimethylene glycol and tetramethylene glycol, and polyester polyols, like reaction products of mixtures of phthalic anhydride and said diols, can be introduced together to the reactor.

The polyols of the transesterifying or esterifying medium can be aliphatic, cycloaliphatic, aromatic, araliphatic and/or heterocyclic, and are preferably selected from the group consisting of diols and triols. Low molecular weight polyols such as aliphatic dihydric alcohols having from 2 to 16 carbon atoms are highly satisfactory. The molecular weight of the polyol advantageously ranges from about 60 to about 500. Examples of suitable polyols include alkylene glycols and glycol ethers, such as ethylene, oxydiethylene, propylene, oxydipropylene, butylene, pentylene, hexylene, and octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, and in general hydroxy-terminated ethers, esters or mixed ether esters having a molecular weight of about 500 or less. The polyols may, of course, be used as mixtures of two or more polyols. The polyols may include substituents which are inert in the reaction, for example, chlorine and bromine substituents. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

The tranesterifying or esterifying medium must contain a polycarboxylic acid or acids, or derivatives thereof, having an effective amount of the above-described ring residues for viscosity improvement of the resulting polyol product. Reaction of the terephthalic acid residues with this medium produces a polyester polyol mixture characterized by lower viscosity than would be obtained by tranesterifying or esterifying the residues with a medium derived solely from the polyol component. A viscosity reduction of at least 10%, and generally of about 30 to over 100%, can be achieved at a given equivalent weight and given content of residual, non-esterified polyol component (e.g., glycol). The acid compounds containing the ring residues may be aromatic, cycloaliphatic, araliphatic and/or heterocyclic compounds, and preferably are aromatic. In addition to the two requisite $$-\overset{O}{\underset{\|}{C}}-O-$$

groups, the acid compounds may have additional $$-\overset{O}{\underset{\|}{C}}-O-$$

groups of —OH groups, and further may include substituents which are inert in the reaction, for example, chlorine and bromine substituents. Compounds having more than one such ring residue can also be used.

Polycarboxylic acids or acid derivatives introduced in the reaction will be converted to esters during the process. Alternatively, the acids or acid derivatives can be pre-reacted to form esters and these esters then introduced in the reaction.

Examples of ring residue-containing acid compounds are phthalic anhydride, isophthalic acid, tetrahydrophthalic anhydride, tetrachlorophthalic anhydride, tetrabromophthalic anhydride, 1,4,5,6,7,7-hexachloro-5-norbornene-2,3-dicarboxylic anhydride and 1,8-naphthalic anhydride. Besides the ring residue-containing acid compounds, other polybasic-carboxylic acid components may be used in the reaction. The optional polybasic-carboxylic acids may be aliphatic, cycloaliphatic, aromatic, araliphatic and/or heterocyclic and may be substituted, for example, with halogen atoms and/or may be unsaturated. The following are mentioned as examples: succinic acid, glutaric acid, adipic acid, suberic acid, azelaic acid, sebacic acid, citric acid, 1,4-cyclohexanedicarboxylic acid, tetrahydrophthalic acid anhydride, hexahydrophthalic acid anhydride, endomethylene tetrahydrophthalic acid anhydride, glutaric acid anhydride, phthalic anhydride, isophthalic acid, terephthalic acid, maleic acid, maleic acid anhydride, fumaric acid, and dimeric and trimeric fatty acids, optionally mixed with monomeric fatty acids.

A particularly useful polycarboxylic acid component contains ring units with two

$$-\overset{O}{\underset{\|}{C}}-O-$$

groups on adjacent (or ortho) ring positions and also ring units with two $$-\overset{O}{\underset{\|}{C}}-O-$$

groups on alternate (or meta) ring positions. Preferred polyester polyols of desirably low viscosity can be produced from polycarboxylic acid components, especially aromatic polyacid components, having this mixture of ring units. The proportion of the ortho disubstituted to meta disubstituted ring units in the mixture can vary broadly, such as from about 10:1 to 1:10 weight %. Even when one of the ring unit types comprises only a relatively minor proportion (e.g., about 5-10% by weight) of the mixture, a significant reduction in polyol viscosity has been realized.

A preferred polycarboxylic acid component containing such a mixture of ring units is a complex by-product from DMT production which contains a high percentage of phenyl esters with ester groups in ortho or meta configurations. This polycarboxylic acid component is herein called "DMT isomeric by-product" and has the following approximate composition:

| Component | % By Weight |
|---|---|
|  H₃COOC—⟨phenyl⟩—COOCH₃ | 18 ± 8 |
|  H₃COOC—⟨phenyl⟩—COOCH₃ | 50 ± 10 |
|  ⟨phenyl⟩(COOCH₃)(COOCH₃) | 6 ± 2 |

| Component | % By Weight |
|---|---|
| H3COOC—C6H3(CH3)—COOCH3 (dimethyl methylterephthalate) | 6 ± 2 |
| H3COOC—C6H4—C(OCH3)2 | 6 ± 2 |
| H3C—C6H4—COOCH3 | 5 ± 3 |
| H3COOC—C6H4—CHO | 4 ± 3 |
| H3C—C6H4—COOH | 2 ± 1 |
| HOOC—C6H4—COOCH3 | 1 ± 0.6 |
| other aromatic compounds | 2 ± 1 |

This DMT isomeric by-product is used in the preparation of aromatic polyester polyols of Examples 3 and 4 below.

The reaction of the terephthalic acid residue is conveniently carried out under normal transesterification or esterification conditions well known and described in the prior art. Illustratively, the reaction can be conducted in the absence of a liquid reaction medium composed of material other than the transesterifying or esterifying ingredients and terephthalic acid residue. The reaction suitably is performed under a flow of nitrogen and at atmospheric, subatmospheric or superatomospheric pressure and temperatures from about 150° C. to about 250° C. for a period from about one hour to about ten hours. Reaction is considered to be substantially complete when the formation of distillate ceases. While reaction is taking place, methanol and any water formed preferably are removed from the reaction vessel. The reaction can be carried out as a batch process or continuously.

The reaction is normally catalyzed. The terephthalic acid residue itself may contain an effective amount of catalyst to promote the present reaction. However, if such a catalyst is not present or not enough of it is present, enough catalyst is added to the reaction mixture to suitably promote the reaction. Any conventional transesterification or esterification catalyst (single compound or mixture of compounds) can be used.

After transesterification or esterification, the reaction product can be reacted with an alkylene oxide to form an aromatic polyester polyol mixture of the invention. This reaction desirably is catalyzed. The temperature of this process should be from about 80° to 170° C., and the pressure should generally range from about 1 to 40 atmospheres.

Although the aromatic polyester polyol mixture of the invention can be employed without being filtered, it is often desirable to filter the mixture prior to its subsequent utilization, such as in foam preparations. Alternatively, the terephthalic acid residue can be filtered before it is reacted. Metal salt removal is effected by the filtration.

In one embodiment of the invention, the terephthalic acid residue, polycarboxylic acid component-containing polyol and catalyst are introduced together to the reactor and thereafter reacted. This method is especially effective when the above "DMT isomeric by-product" of the invention is used as the polycarboxylic acid component. According to another embodiment of the invention, the acid component, such as phthalic anhydride, and the polyol component, such as diethylene and/or dipropylene glycol, are reacted first in the presence of the catalyst, such as tetraisopropyl titanate, to form a polyester polyol. Then the terephthalic acid residue is added and the process is continued.

The proportions of terephthalic acid residue to polyol to acid or derivative thereof may be varied to a considerable degree in accordance with the product desired. At all events, sufficient polyol and acid component should be employed to form a polyester polyol having a usable viscosity, such as below 40,000 cps at 25° C., and capable of efficiently polymerizing with organic polyisocyanates in the formation of rigid foams.

The saponification number of the DMT process residue (a measure of transesterification sites) should be considered in selecting reaction proportions. Similarly, the acid number is used in determining reaction proportions for the carboxyl functional residues of the invention. Suitable proportions of the reactants in the transesterification or esterification may be as follows:

Equivalents ratio of total polyol component [e.g., glycol(s), preferably dipropylene glycol and/or diethylene glycol] to total acid [DMT process residue or carboxyl functional residue acid + polycarboxylic acid component, preferably phthalic anhydride and/or DMT isomeric by-product] = 1.4:1 to 3.5:1, preferably 1.6:1 to 2.0:1.

Equivalents ratio of DMT process residue or carboxyl functional residue acid to polycarboxylic acid component, preferably phthalic anhydride and/or DMT isomeric by-product = 0.15:1 to 4.0:1, preferably 0.22:1 to 2.70:1. Since the desirably low viscosity of the polyester polyol product is promoted by the presence of the ring unit-containing polycarboxylic acid component in the transesterifying or esterifying medium, much lower DMT process residue or carboxyl functional residue acid:polycarboxylic acid component equivalent ratios, with an accompanying increase in the amount of polyol component, may of course be employed.

The properties of the polyester polyol mixtures of the present invention fall within rather broad ranges because of the complexity and variable nature of the terephthalic acid residues themselves. Accordingly, the viscosities (Brookfield) of the polyol mixtures measured in cps. at 25° C. fall within a rather broad range from about 500 to about 500,000, preferably about 500 to about 30,000, and most preferably about 700 to about 3,000; the hydroxyl number values fall within a range of from about 150 to about 950, preferably about 230 to about 650, and most preferably from about 260 to about 510; the acid number falls within a range of from about 0.2 to about 40 and preferably about 0.2 to about 10.

The transesterifying or esterifying polyol component (e.g., glycol) is preferably employed in excess in the reaction so that at the end of the reaction there is an excess of transesterifying or esterifying polyol remaining in the polyol mixture of the invention. This excess can vary broadly but advantageously falls within a range of from 5 to 35, preferably 8 to 20, percent by weight of the polyol mixture. Excess polyol can be distilled from the transesterified or esterified polyol mixture for appropriate adjustment of viscosity and equivalent weight. Advantageously, the distillation is conducted to yield a polyester polyol as above described, e.g., preferably having a viscosity of about 500 to 30,000 and a hydroxyl number of about 230 to 650.

Most preferred polyol mixtures of the invention employing diethylene glycol as transesterifying or esterifying glycol are characterized by a viscosity in cps. at 25° C. of about 1,000 to about 25,000, a free diethylene glycol content of from about 10 to about 20 percent by weight of said mixture, a hydroxyl number within a range of from about 275 to about 400, and an acid number of about 0.2 to about 10.

Other highly preferred polyol mixtures of the invention employing dipropylene glycol as transesterifying or esterifying glycol are characterized by a viscosity in cps. at 25° C. of about 10,000 to about 25,000, a free dipropylene glycol content of from about 10 to about 20 percent by weight of said mixture, a hydroxyl number within a range of from about 260 to about 400, and an acid number of about 0.2 to about 10. These polyol mixtures exhibit good compatibility with halogenated organic blowing agents.

Although the polyol mixtures of this invention can be readily produced as fluid materials, particularly by employing excess glycol transesterifying or esterifying agent and leaving residual glycol in the mixtures, additional diluents can be employed with the polyol mixtures. Inert diluents can be employed, but it is usually preferred to employ liquid polyols. Therefore, in a preferred embodiment of the present invention, diols such as diethylene glycol or dipropylene glycol, or other suitable polyols may be added in a later step to reduce the viscosity of the polyol mixture.

For purposes of viscosity reduction, these diluents are generally employed in only minor amounts, as, e.g., in the range of about 1 to 40 percent, preferably about 5 to 30 percent, by weight of the polyol mixture. However, it is also within the scope of the present invention to form polyol mixtures wherein the transesterifying or esterifying polyol and are subsequently added polyol are present in greater amounts. The content of transesterifying or esterifying and optionally added polyol in the mixture can be progressively increased to the point where they are the major component and the transesterified or esterified mixture of the invention is present in only minor amount, as, e.g., in the range of about 1 to 20 percent by weight of the transesterifying or esterifying and optionally added polyol.

The aromatic polyester polyol mixtures of the present invention may be used in the preparation of both cellular and non-cellular polymers. The latter polymers, such as the polyisocyanurates and polyurethanes, can be prepared by using standard techniques known to those skilled in the art. The polyol mixtures are particularly useful in the preparation of polyisocyanurate foams and polyurethane foams. These foams can be prepared by mixing together the organic polyisocyanate with the polyol, catalyst and blowing agent at temperatures ranging from about 0° C. to 150° C.

The polyurethane foams can be prepared by reacting the polyol mixture of the invention and polyisocyanate on an essentially 1:1 to 1:1.2 equivalent basis. In an advantageous embodiment of the invention, the polyol mixture of the invention is employed in admixture with at least one other polyol to produce polyurethane foams. In this embodiment, the polyol mixture of the invention can comprise about 5 to 100, preferably about 20 to 50, weight percent of the total polyol content in the foam preparations. The polyisocyanurate foams of the invention are prepared by reacting the polyisocyanate with a minor amount of polyol, such as sufficient polyol to provide about 0.10 to 0.55 hydroxyl equivalents of polyol per equivalent of said polyisocyanate, wherein the polyol mixture of the invention comprises about 5 to 100 weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as B 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The polyols which can be employed in combination with the polyol mixture of the invention in the preparation of the polyurethane and polyisocyanurate foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

wherein R is an alkylene radical containing at least 2 to 6 carbon atoms and E is a polyoxyalkylene chain; amine based polyethers of the formula:

wherein R is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphonic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used in combination with the polyol mixture of the invention. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol)propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Any blowing agent typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with a reactive hydrogen containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N',N'-tetramethyl-1,3-butanediamine, N,N-dimethylethanolamine, N,N-diethylethanolamine, and the like. The catalysts generally comprise from 0.1 to 20, and preferably from 0.3 to 10, weight percent of the total composition.

Other additives may also be included in the foam formulations. Included are flame retardants, such as tris(2-chloroethyl)-phosphate, dispersing agents, plasticizers, fillers and pigments.

In a preferred rigid foam of the invention containing polyisocyanurate linkages, the organic polyisocyanate is polymethylene polyphenylisocyanate. The polymethylene polyphenylisocyanates desirably have a functionality of at least 2:1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,536,652 at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction of isocyanurate foams, the polymethylene polyphenylisocyanate and the polyol are generally mixed in an equivalent ratio of 1.5:1 to 6:1 and preferably 2.1 to 5:1. In ranges outside these proportions the reaction tends to yield a product having less desirable physical characteristics.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of tertiary amino phenol, such as 2,4,6-tris(-dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition in desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Figure 1:
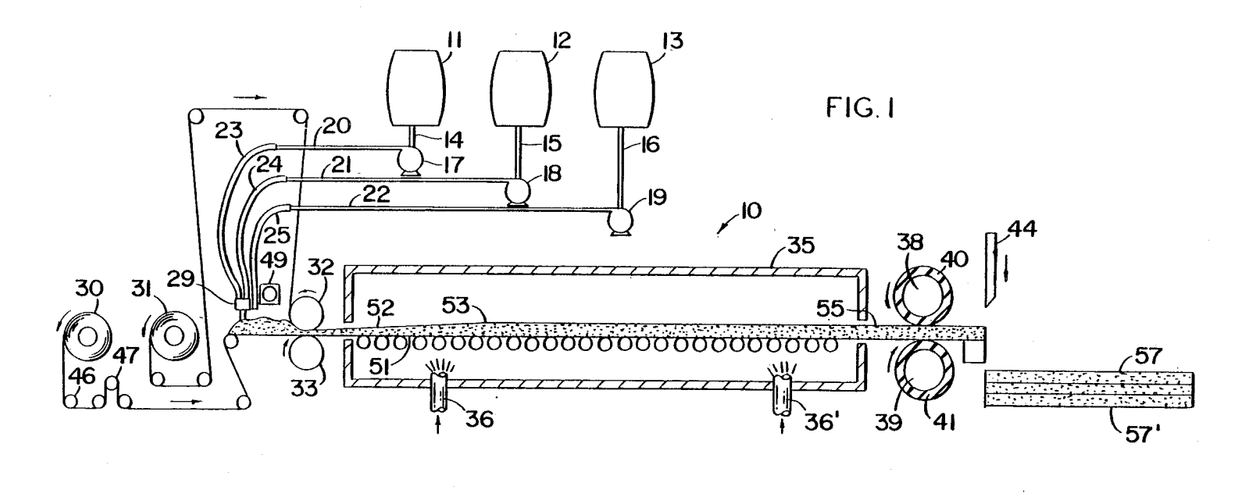
FIG. 1 is a side schematic representation of an apparatus suitable for producing a cellular foam material in accordance with the present invention.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In the production of a laminate of a polyisocyanurate foam, the isocyanate tank 11 is charged with the organic polyisocyanate admixed with the blowing agent and the surfactant, and the polyol tank 12 is charged with the polyol mixture of the invention, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 52, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the over 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Figure 2:
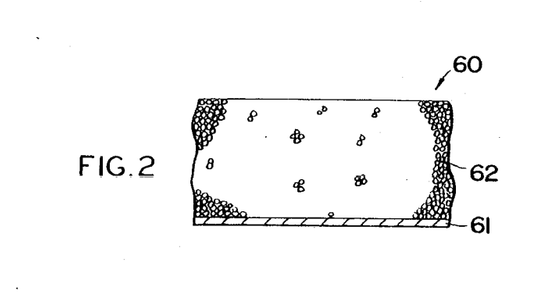
FIG. 2 is a cross-sectional view of a laminated building panel having one facing sheet.
Figure 3:
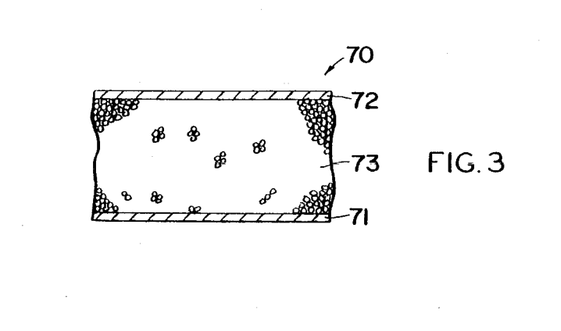
FIG. 3 is a cross-sectional view of a laminated building panel having two facing sheets.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation of Transesterified Polyol Mixtures

This example illustrates the preparation of aromatic polyester polyols by transesterifying dimethyl terephthalate (DMT) process residues with either (a) diethylene glycol (DEG) or (B) polyester polyols derived from phthalic anhydride (PA) and DEG.

A. TRANSESTERIFICATION WITH POLYOL

The preparation of Polyol Nos. 1 to 5 of Table I below was initiated by placing the listed qunatities of the ingredients in a resin kettle equipped with a stirrer, thermometer and distillation head. The ingredients then were brought to 225° C. and held at this temperature for 2 hours. During this time, methanol and some water were distilled from the reaction mixture. After 2 hours at 225° C., distillation ceased and the product was cooled to ambient temperature.

Characteristics of the aromatic polyester polyols produced are shown in Table I.

B. TRANSESTERIFICATION WITH POLYCARBOXYLIC ACID-CONTAINING POLYOL

The preparation of Polyol Nos. 6 to 8 of Table I below was initiated by placing the listed quantities of phthalic anhydride (PA), diethylene glycol (DEG) and catalyst in a resin kettle equippd with a stirrer, thermometer and distillation head. The ingredients then were brought to 230° C. and held at this temperature for 75 minutes. During this time, water of esterification was distilled from the reaction mixture. The listed quantity of DMT process residue then was added and the temperature was brought to 225° C. and held for 2 hours at this temperature. During this period, methanol and some water were distilled from the reaction mixture. After 2 hours at 225° C., distillation ceased and the product was cooled to ambient temperature.

Characteristics of the aromatic polyester polyols produced are shown in Table I.

The Table I results show that replacing DEG with the PA/DEG polyester polyol brings about a significant lowering in viscosity and hence workability of the resultant polyol at a given equivalent weight and residual DEG content.

TABLE I

| | TRANSESTERIFIED POLYOL MIXTURES | | | | | | | | |
|---|---|---|---|---|---|---|---|---|---|
| POLYOL NO. | DMT PROCESS RESIDUE (g) | PA (g) | DEG (g) | TPT[4] (ml) | Mn(OAc)$_2$[5] (g) | OH NO. | EQ. WT. | RESIDUAL DEG (%) | BROOKFIELD VISCOSITY (cps) |
| 1 | 480[1] | — | 420 | 1 | — | 320 | 176 | 15.5 | 31,200 |
| 2 | 480[1] | — | 420 | — | 2 | 331 | 169 | 16.2 | 20,400 |
| 3 | 480[2] | — | 420 | — | 2 | 310 | 181 | 13.6 | 19,000 |
| 4 | 480[3] | — | 420 | — | 2 | 306 | 183 | 14.2 | 19,300 |
| 5 | 461[3] | — | 364.9 | — | 2 | 276 | 203 | 10.9 | 44,800 |
| 6 | 384[3] | 96 | 471 | 1 | — | 299 | 188 | 14.3 | 11,400 |
| 7 | 138[1] | 105.3 | 271.5 | 0.5 | — | 318 | 177 | 14.6 | 5,360 |
| 8 | 384[3] | 96 | 431 | 1 | — | 277 | 202 | 11.8 | 25,400 |

[1]Residue = Terate ® 101 having acid number of 23.8 and saponification number of 535 (Hercules, Inc.).
[2]Residue has acid number of 88.9, saponification number of 583.5 and DMT content of 11%.
[3]Residue has acid number of 54, saponification number of 598.2 and DMT content of 13%.
[4]Catalyst is tetraisopropyltitanate.
[5]Catalyst is manganese acetate in the form of Mn(OAc)$_2$.4H$_2$O.

EXAMPLE 2

Preparation of Transesterified Polyol Mixtures

This example illustrates the preparation of aromatic polyester polyols by transesterifying DMT process residues with either (a) dipropylene glycol (DPG) or (b) polyester polyols derived from phthalic anhydride (PA) and glycols.

Polyol No. 9 of Table II below was prepared according to the procedure of Example 1A, and Polyol Nos. 10 to 12 of the table were prepared according to the procedure of Example 1B. Characteristics of the aromatic polyester polyols produced are shown in Table II.

The Table II results show that replacing DPG with the polycarboxylic acid component-containing glycols brings about a significant lowering in viscosity of the polyol product at a given equivalent weight and residual glycol content.

TABLE II

TRANSESTERIFIED POLYOL MIXTURES

| POLYOL NO. | DMT PROCESS RESIDUE (g) | PA (g) | DPG (g) | MIXED GLYCOLS[2] (g) | TPT[3] (ml) | OH NO. | EQ WT. | RESIDUAL GLYCOL(S) (%) | BROOKFIELD VISCOSITY (cps) |
|---|---|---|---|---|---|---|---|---|---|
| 9  | 400[1]   | —      | 462   | —       | 1  | 271 | 207 | 17.2 | 49,800 |
| 10 | 320[1]   | 80     | 515   | —       | 1  | 273 | 205 | 17.4 | 26,200 |
| 11 | 280[1]   | 120    | 541.3 | —       | 1  | 273 | 205 | 18.3 | 18,480 |
| 12 | 9806.4[1]| 4212.2 | —     | 18659.4 | 35 | 266 | 211 | 14.9 | 10,400 |

[1]Residue has acid number of 54, saponification number of 598.2 and DMT content of 13%.
[2]Mixture of approximately 85% DPG and 15% tripropylene glycol (Arco Chemical Company).
[3]Catalyst is tetraisopropyltitanate.

EXAMPLE 3

Preparation of Transesterified Polyol Mixtures

This example illustrates the preparation of aromatic polyester polyols by reacting DMT process residues with either (a) diethylene glycol (DEG) or (b) DEG and the DMT isomeric by-product (ISOMERS) of the invention.

Polyol Nos. 13 to 21 of Table III below were prepared according to the procedure of Example 1A, except that for Polyol Nos. 16 to 21 the ISOMERS were added together with the DMT proces residues and DEG. Characteristics of the aromatic polyester polyols produced are shown in Table III.

The Table III results show that replacing DEG with the polyester polyols derived from the DMT isomeric by-product significantly lowers the viscosity of the polyol product at a given equivalent weight and residual DEG content.

Polyol Nos. 22 and 23 of Table IV below were prepared according to the procedure of Example 1A, except that the ISOMERS were added together with the DMT process residues and DEG. Polyol No. 24 of the Table was prepared according to the procedure of Example 1B. Characteristics of the aromatic polyester polyols produced are shown in Table IV.

TABLE IV

TRANSESTERIFIED POLYOL MIXTURES

| POLYOL NO. | DMT PROCESS RESIDUE (g) | PA (g) | ISOMERS[2] (g) | DEG (g) | TPT[3] (ml) | Mn(OAc)$_2$[4] (g) | OH NO. | EQ. WT. | RESIDUAL DEG (%) | BROOKFIELD VISCOSITY (cps) |
|---|---|---|---|---|---|---|---|---|---|---|
| 22 | 120[1]  | —     | 360 | 497 | —    | 2 | 313 | 179 | 15.5 | 3600 |
| 23 | 96[1]   | —     | 384 | 504 | —    | 2 | 311 | 180 | 16.1 | 2720 |
| 24 | 98.2[1] | 294.5 | —   | 507 | 1 ml | — | 323 | 174 | 19.6 | 2550 |

[1]Residue has acid number of 54, saponification number of 598.2 and DMT content of 13%.
[2]DMT isomeric by-product (ISOMERS) has the composition shown above in the description of the invention.
[3]Catalyst is tetraisopropyltitanate.
[4]Catalyst is manganese acetate in the form of Mn(OAc)$_2$.4H$_2$O.

EXAMPLE 5

This example illustrates the synthesis of polyisocyanurate foams (18% Trimer) utilizing aromatic polyester polyols of the invention.

In each foam synthesis, the following quantities of the following ingredients were combined as indicated:

| Item | Ingredient | Quantity (grams) |
|---|---|---|
| A | Polymethylene polyphenyl isocyanate | 232 |
| B | CFCl$_3$ | 50 |

TABLE III

TRANSESTERIFIED POLYOL MIXTURES

| POLYOL NO. | DMT PROCESS RESIDUE (g) | ISOMERS[4] (g) | DEG (g) | Mn(OAc)$_2$[5] (g) | OH NO. | EQ. WT. | RESIDUAL DEG (%) | BROOKFIELD VISCOSITY (cps) |
|---|---|---|---|---|---|---|---|---|
| 13 | 480[1] | —   | 420   | 2 | 331 | 169 | 16.2 | 20,400 |
| 14 | 480[2] | —   | 420   | 2 | 310 | 181 | 13.6 | 19,000 |
| 15 | 480[3] | —   | 420   | 2 | 306 | 183 | 14.2 | 19,300 |
| 16 | 432[3] | 48  | 430.5 | 2 | 315 | 178 | 14.8 | 15,700 |
| 17 | 384[3] | 96  | 439.8 | 2 | 316 | 178 | 15.0 | 11,400 |
| 18 | 384[2] | 96  | 439.8 | 2 | 311 | 180 | 15.3 | 11,900 |
| 19 | 240[2] | 240 | 471.6 | 2 | 333 | 169 | 16.2 | 5,500  |
| 20 | 138[1] | 138 | 271.5 | 1 | 348 | 161 | 16.5 | 2,900  |
| 21 | 138[1] | 138 | 271.5 | 1 | 322 | 174 | 15.1 | 5,800  |

[1]Residue = Terate ® 101 having acid number of 23.8 and saponification number of 535 (Hercules, Inc.).
[2]Residue has acid number of 88.9, saponification number of 583.5 and DMT content of 11%.
[3]Residue has acid number of 54, saponification number of 598.2 and DMT content of 13%.
[4]DMT isomeric by-product (ISOMERS) has the composition shown above in the description of the invention.
[5]Catalyst is manganese acetate in the form of Mn(OAc)$_2$.4H$_2$O.

EXAMPLE 4

Preparation of Transesterified Polyol Mixtures

This example illustrates the preparation of aromatic polyester polyols by reacting DMT process residues with polycarboxylic acid component-containing polyols derived from either (a) the DMT isomeric by-product (ISOMERS) or (b) phthalic anhydride (PA).

| | | |
|---|---|---|
| C | Silicone surfactant | 2 |
| D | Aromatic polyester polyol (See Table V) | 68 |
| E | Catalyst (See Table V) | 9 |

A mixture of Items A and B, at a temperature of 15° C., was poured into a reaction vessel. Items C and D were then added to the vessel, and all ingredients were mixed at 3600 rpm for 5 seconds. Item E described in Table V was then mixed into the contents of the vessel over a 5 second interval. All ingredients were thereafter mixed at 3600 rpm for an additional 7 seconds and then poured into a box, yielding a polyisocyanurate foam.

Characteristics of the foams produced are shown in the following Table V.

In the foam syntheses, Item A is a polymethylene polyphenyl isocyanate having an equivalent weight of 138, an acidity of 0.03% HCl, and a viscosity of 2000 centipoises at 25° C. and is available from the Mobay Chemical Corporation, Pittsburgh, Pa. under the trade name MONDUR MR-200.

Item C is that supplied by the Union Carbide Corporation under the trade designation Y-10222.

TABLE V

18% TRIMER[1] POLYISOCYANURATE FOAMS

| FOAM | POLYOL NO. | CATA-LYST | CREAM TIME (sec) | FIRM TIME (sec) | CELL QUALITY |
|---|---|---|---|---|---|
| A | 7[2] | I[5] | 31 | 95 | Fine-celled |
| B | 20[3] | " | 20 | 50 | Fine-celled |
| C | 21[3] | " | 19 | 40 | Fine-celled |
| D | 23[4] | II[6] | 18 | 34 | Fine-celled |
| E | 24[4] | " | 22 | 46 | Fine-celled |

[1]% Trimer =
$$\frac{\text{(No. of equivalents of isocyanate} - \text{No. of equivalents of polyol)}}{\text{(Wt. of isocyanate + Wt. of polyol)}} \times 4200$$
[2]Of Example 1.
[3]Of Example 3.
[4]Of Example 4.
[5]Catalyst I is a blend of DMP-30:potassium-2-ethyl hexoate:diethylene glycol in a 1:4.2:7.8 weight ratio.
[6]Catalyst II is a blend of DMP-30:potassium-2-ethyl hexoate:potassium acetate:-diethylene glycol in a 0.69:1.62:1.18:6.51 weight ratio.

EXAMPLE 6

This example illustrates the synthesis of polyurethane foams of 115 Index utilizing aromatic polyester polyols of the invention.

In the foam syntheses, the following quantities of the following ingredients were combined as indicated:

| Item | Ingredient | Quantity (grams) |
|---|---|---|
| A | Sucrose amine polyol[1] | 42.25 |
| B | Polyether polyol[2] | 32.45 |
| C | Diethyl bis(2-hydroxyethyl) aminomethyl phosphonate[3] | 15.00 |
| D | Aromatic polyester polyol (See Table VI) | 51.80 |
| E | Silicone surfactant[4] | 3.5 |
| F | N,N—dimethylcyclohexylamine[5] | 0.26 |
| G | CFCl$_3$ | 55.0 |
| H | Polymethylene polyphenyl isocyanate[6] (See Table VI) | |

[1]Item A is that supplied by Olin Corporation under the trade name Poly G 71-530.
[2]Item B is that supplied by Dow Chemical Company under the trade name Voranol RA-800.
[3]Item C is a flame retardant supplied by Stauffer Chemical Corporation under the trade name Fyrol 6.
[4]Item E is that supplied by Dow Corning Corporation under the trade name DC-193.
[5]Item F is an amine catalyst supplied by Abbott Laboratories under the trade name Polycat 8.
[6]Item H is a polymethylene polyphenyl isocyanate having a viscosity of 150-250 centipoises at 25° C. and is available from Mobay Chemical Corporation under the trade name Mondur MR.

In each foam preparation, a premix of Items A, B, C, D and G at ambient temperature was poured into a reaction vessel. Items E and F at ambient temperature were then added to the vessel, and all ingredients were mixed at 1000 rpm for ca. 10 seconds. Lastly, Item H at 15° C. was added to the vessel and all ingredients were mixed at 3500 rpm for 15 seconds, and thereafter poured into a box to yield a rigid polyurethane foam.

Various characteristics of the polyurethane foams (Foams A and B) produced are shown in Table VI below.

TABLE VI

115 INDEX[1] POLYURETHANE FOAMS

| FOAM | POLYOL NO | ISOCYAN-ATE (g) | CREAM TIME (sec) | GEL TIME (sec) | FIRM TIME (sec) | TACK FREE TIME (sec) | DENSITY (pcf) | FRIABILITY[4] (% wt. loss) |
|---|---|---|---|---|---|---|---|---|
| A | 25[2] | 194 | 22 | 58 | 66 | 95 | 1.67 | <.1 |
| B | 12[3] | 192 | 25 | 77 | 94 | 120 | 1.89 | — |

| FOAM | POLYOL NO | ISOCYANATE (g) | OXYGEN[5] INDEX | K-Factor[6] 1 day | K-Factor[6] 30 days | DIMENSIONAL STABILITY[7] % ΔV$_{max}$, 28 days 70° C./95% R.H. | DIMENSIONAL STABILITY[7] % ΔV$_{max}$, 28 days 110° C. |
|---|---|---|---|---|---|---|---|
| A | 25[2] | 194 | 23.75 | .135 | .150 | 21 | 34 |
| B | 12[3] | 192 | 23.75 | .134 | .155 | 24 | 39 |

[1]NCO/OH Index = (Eq. NCO/Eq.OH) × 100.
[2]Polyol was prepared in the manner described in Example 1 for Polyol No. 8.
[3]Of Example 2.
[4]According to ASTM Test Method C-421.
[5]Flammability test conducted according to ASTM D-2863-70, except that a sample measuring ¼" × ¼" × 6" was used.
[6]Units = Btu-in/hr-ft$^2$-°F.
[7]According to ASTM Test Method D 2126.

EXAMPLE 7

This example illustrates the synthesis of polyisocyanate foams (14% Trimer) utilizing aromatic polyester polyols of the invention.

In the foam syntheses, the following quantities of the following ingredients were combined as indicated:

| Item | Ingredient | Quantity (grams) |
|---|---|---|
| A | Polymethylene polyphenyl isocyanate | (See Table VII) |
| B | CFCl$_3$ | 55 |
| C | Silicone surfactant | 2.5 |
| D | Aromatic polyester polyol | (See Table VII) |
| E | Catalyst | (See Table VII) |

The foams were produced according to the procedure of Example 5 utilizing the same isocyanate and surfactant and the polyols and catalyst listed in Table VII below. Characteristics of the foams are shown in the table.

TABLE VII

| | 14% TRIMER[1] POLYISOCYANURATE FOAMS | | | | | | |
|---|---|---|---|---|---|---|---|
| FOAM | ISOCYANATE (g) | POLYOL (g) | CATALYST[4] (g) | CREAM TIME (sec) | FIRM TIME (sec) | DENSITY (pcf) | FRIABILITY[5] (% wt. loss) |
| A | 200 | 100[2] | 11 | 14 | 35 | 1.60 | — |
| B | 199 | 101[3] | 10.9 | 20 | 56 | 1.73 | 21 |

| | | | | | | | DIMENSIONAL STABILITY[8] | |
|---|---|---|---|---|---|---|---|---|
| FOAM | ISOCYANATE (g) | POLYOL (g) | CATALYST[4] (g) | OXYGEN INDEX[6] | K-FACTOR[7] after 1 day | 30 days | % $\Delta V_{max}$, 28 days 70° C./95% R.H. | % $\Delta V_{max}$, 28 days 110° C. |
| A | 200 | 100[2] | 11 | 25.25 | — | .148 | 15 | 14 |
| B | 199 | 101[3] | 10.9 | 22.75 | .135 | .160 | 13 | 10 |

[1] % Trimer = $\frac{(\text{No. of equivalents of isocyanate} - \text{No. of equivalents of polyol})}{(\text{Wt. of isocyanate} + \text{Wt. of polyol})} \times 4200$
[2] Polyol No. 25 of Example 6.
[3] Polyol No. 12 of Example 2.
[4] Catalyst is Catalyst I of Table V.
[5] According to ASTM Test Method C-421.
[6] Flammability test conducted according to ASTM D-2863-70, except that a sample measuring ¼" × ¼" × 6" was used.
[7] Units = Btu-in/hr-ft²-°F.
[8] According to ASTM Test Method D 2126.

I claim:

1. A polyester polyol produced by reacting a polycarboxylic acid component-containing polyol with a terephthalic acid residue selected from the group consisting of
   (a) a residue remaining after dimethyl terephthalate and methyl p-toluate have been removed from the product of oxidation of p-xylene in the preparation of dimethyl terephthalate, and
   (b) a carboxyl functional residue resulting from the removal of terephthalic acid from the mixture obtained by the oxidation of p-xylene in the preparation of terephthalic acid, wherein the polycarboxylic acid component-containing polyol is derived from a polycarboxylic acid component and a polyol component and the polycarboxylic acid component has ring units with two groups on adjacent or alternate ring positions, the ring unit content of the polycarboxylic acid component being sufficient for viscosity reduction of the polyester polyol.

2. The polyester polyol of claim 1 wherein the polycarboxylic acid component has aromatic ring units selected from the group consisting of units with two groups on adjacent ring positions, units with two groups on alternate ring positions, and mixtures thereof, and the terephthalic acid residue is residue (a).

3. The polyester polyol of claim 2 wherein the polycarboxylic acid component has a mixture of aromatic ring units of the formulas in a weight ratio of about 10:1 to 1:10.

4. The polyester polyol of claim 2 wherein the polyol component is an aliphatic dihydric alcohol having 2 to 16 carbon atoms.

5. The polyester polyol of claim 2 wherein the polyol component is a member selected from the group consisting of diethylene glycol, dipropylene glycol, triethylene glycol, tripropylene glycol, tetraethylene glycol, tetrapropylene glycol, trimethylene glycol, tetramethylene glycol, and mixtures thereof.

6. The polyester polyol of claim 2 wherein residue (a) is a member selected from the group consisting of
   (i) the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids,
   (ii) the by-product fraction from the manufacture of dimethyl terephthalate whose major portion comprises about 15 to 70 weight percent of dimethyl terephthalate, and about 85 to 30 weight percent of a mixture of monomethyl terephthalate, bi-ring esters and polymeric materials, and
   (iii) mixtures thereof.

7. The polyester polyol of claim 2 wherein the polycarboxylic acid component is a member selected from the group consisting of phthalic anhydride; phthalic acid; isophthalic acid; esters of said polycarboxylic acid components; a mixture of the composition:

| Component | % By Weight |
|---|---|
| $H_3COOC-\bigcirc-COOCH_3$ | 18 ± 8 |

| Component | % By Weight |
|---|---|
|  dimethyl terephthalate | 50 ± 10 |
|  dimethyl phthalate | 6 ± 2 |
|  | 6 ± 2 |
|  | 6 ± 2 |
|  methyl p-toluate | 5 ± 3 |
|  | 4 ± 3 |
|  | 2 ± 1 |
|  | 1 ± 0.6 |
| other aromatic compounds | 2 ± 1; and | mixtures thereof.

8. The polyester polyol of claim 7 wherein the polyol component is diethylene glycol and the polyester polyol is characterized by a viscosity in cps at 25° C. of about 1,000 to about 25,000, a free diethylene glycol content of from about 10 to about 20 percent by weight of the polyester polyol, a hydroxyl number within a range of from about 275 to about 400, and an acid number of about 0.2 to about 10.

9. The polyester polyol of claim 2 wherein the polycarboxylic acid component is a member selected from the group consisting of phthalic anhydride; phthalic acid; isophthalic acid; esters of said polycarboxylic acid components; a mixture of the composition:

| Component | % By Weight |
|---|---|
|  | 18 ± 8 |
|  | 50 ± 10 |
|  | 6 ± 2 |
|  | 6 ± 2 |
|  | 6 ± 2 |
|  | 5 ± 3 |
|  | 4 ± 3 |
|  | 2 ± 1 |
|  | 1 ± 0.6 |
| other aromatic compounds | 2 ± 1; and | mixtures thereof.

10. The polyester polyol of claim 9 wherein the polyol component is dipropylene glycol and the polyester polyol is characterized by a viscosity in cps. at 25° C. of about 10,000 to about 25,000, a free dipropylene glycol content of from about 10 to about 20 percent by weight of the polyester polyol, a hydroxyl number within a range of from about 260 to about 400, and an acid number of about 0.2 to about 10.

11. A polyester polyol produced by a process comprising
 (a) reacting a polycarboxylic acid component-containing polyol with a terephthalic acid residue selected from the group consisting of
  (i) a residue remaining after dimethyl terephthalate and methyl p-toluate have been removed from the product of oxidation of p-xylene in the preparation of dimethyl terephthalate, and
  (ii) a carboxyl functional residue resulting from the removal of terephthalic acid from the mixture obtained by the oxidation of p-xylene in the preparation of terephthalic acid, and (b) subsequently reacting the reaction product of step (a) with an alkylene oxide to give a polyester polyol, wherein the polycarboxylic acid component-containing polyol is derived from a polycarboxylic acid component and a polyol component and the polycarboxylic acid component has ring units with two groups on adjacent or alternate rig positions, the ring unit content of the polycarboxylic acid component being sufficient for viscosity reduction of the polyester polyol.

12. A polyester polyol produced by a process comprising
    (a) reacting a polycarboxylic acid component-containing polyol with a terephthalic acid residue selected from the group consisting of
        (i) a residue remaining after dimethyl terephthalate and methyl p-toluate have been removed from the product of oxidation of p-xylene in the preparation of dimethyl terephthalate, and
        (ii) a carboxyl functional residue resulting from the removal of terephthalic acid from the mixture obtained by the oxidation of p-xylene in the preparation of terephthalic acid, and
    (b) distilling non-esterified polyol component from the reaction product of step (a) to give a polyester polyol having a viscosity of about 500 to 30,000 and a hydroxyl number of about 230 to 650, wherein the polycarboxylic acid component-containing polyol is derived from a polycarboxylic acid component and a polyol component and the polycarboxylic acid component has ring units with two groups on adjacent or alternate ring positions, the ring unit content of the polycarboxylic acid component being sufficient for viscosity reduction of the polyester polyol.

13. A process for preparing the polyester polyol of claim 1 comprising reacting a polycarboxylic acid component-containing polyol with a terephthalic acid residue selected from the group consisting of
    (a) a residue remaining after dimethyl terephthalate and methyl p-toluate have been removed from the product of oxidation of p-xylene in the preparation of dimethyl terephthalate, and
    (b) a carboxyl functional residue resulting from the removal of terephthalic acid from the mixture obtained by the oxidation of p-xylene in the preparation of terephthalic acid, wherein the polycarboxylic acid component-containing polyol is derived from a polycarboxylic acid component and a polyol component and the polycarboxylic acid component has ring units with two groups on adjacent or alternate ring positions, the ring unit content of the polycarboxylic acid component being sufficient for viscosity reduction of the polyester polyol.

14. A polyisocyanurate foam comprising the reaction product of an organic polyisocyanate, a blowing agent, a trimerization catalyst, and a minor amount of a polyol, wherein from about 5 to 100 weight percent of the polyol comprises the polyester polyol of claim 1.

15. A process for producing a polyisocyanurate foam comprising reacting together under foam-forming conditions an organic polyisocyanate, a blowing agent, a trimerization catalyst, and a minor amount of a polyol, wherein from about 5 to 100 weight percent of the polyol comprises the polyester polyol of claim 1.

16. A polyurethane foam comprising the reaction product of an organic polyisocyanate, a blowing agent, a catalyst and a polyol, wherein from about 5 to 100 weight percent of the polyol comprises the polyester polyol of claim 1.

17. A process for producing a polyurethane foam comprising reacting together under foam-forming conditions an organic polyisocyanate, a blowing agent, a catalyst and a polyol, wherein from about 5 to 100 weight percent of the polyol comprises the polyester polyol of claim 1.

18. A laminate comprising at least one facing sheet adhered to the polyisocyanurate foam of claim 14.

19. A process for producing a laminate comprising
    (a) contacting at least one facing sheet with a polyisocyanurate foam-forming mixture comprising an organic polyisocyanate, a blowing agent, a trimerization catalyst and a minor amount of a polyol, wherein from about 5 to 100 weight percent of the polyol comprises the polyester polyol of claim 1, and
    (b) foaming said foam-forming mixture.

20. A laminate comprising at least one facing sheet adhered to the polyurethane foam of claim 16.

21. A process for producing a laminate comprising
    (a) contacting at least one facing sheet with a polyurethane foam-forming mixture comprising an organic polyisocyanate, a blowing agent, a catalyst and a polyol, wherein from about 5 to 100 weight percent of the polyol comprises the polyester polyol of claim 1, and
    (b) foaming said foam-forming mixture.

* * * * *